US011169329B2

(12) United States Patent
Nakayama et al.

(10) Patent No.: US 11,169,329 B2
(45) Date of Patent: Nov. 9, 2021

(54) OPTICAL RECEIVER AND OPTICAL BLOCK

(71) Applicant: Sumitomo Electric Industries, Ltd., Osaka (JP)

(72) Inventors: Kenichi Nakayama, Osaka (JP); Masanobu Kawamura, Osaka (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 16/911,131

(22) Filed: Jun. 24, 2020

(65) Prior Publication Data

US 2020/0408993 A1    Dec. 31, 2020

(30) Foreign Application Priority Data

Jun. 28, 2019    (JP) .............. JP2019-120943

(51) Int. Cl.
*H04B 10/06*    (2006.01)
*G02B 6/293*    (2006.01)
*G02B 6/42*    (2006.01)

(52) U.S. Cl.
CPC .......... *G02B 6/2938* (2013.01); *G02B 6/421* (2013.01); *G02B 6/4206* (2013.01); *G02B 6/4214* (2013.01)

(58) Field of Classification Search
CPC ....... H04J 14/02; H04B 10/40; H04B 10/506; H04B 10/60; H04B 10/66; H04B 10/691; G02B 6/2938; G02B 6/29367; G02B 6/4215; G02B 6/4292; G02B 6/4214; G02B 6/4206
USPC ......... 398/79, 135, 136, 137, 138, 139, 158, 398/159, 82, 85, 86, 87, 202, 208, 209, 398/164, 212, 213, 214; 385/24, 37, 88, 385/89, 90, 92, 93
See application file for complete search history.

(56) References Cited

U.S. PATENT DOCUMENTS

| | | | |
|---|---|---|---|
| 6,198,864 B1* | 3/2001 | Lemoff | G02B 6/29367 385/24 |
| 8,540,437 B2* | 9/2013 | Lee | G02B 6/4215 385/93 |
| 9,551,833 B1* | 1/2017 | Li | G02B 6/29365 |

(Continued)

FOREIGN PATENT DOCUMENTS

JP    2017-032731 A    2/2017

*Primary Examiner* — Hanh Phan
(74) *Attorney, Agent, or Firm* — Baker Botts L.L.P.; Michael A. Sartori

(57) ABSTRACT

An optical receiver includes: an optical stub which includes an optical fiber; an optical demultiplexer; a plurality of photo detectors; a TIA; an optical block including a first concavity, a second concavity, a first reflective plane, a second reflective plane, and a third reflective plane, the first concavity being configured to hold the optical stub, the second concavity being configured to accommodate the optical demultiplexer, the first reflective plane and the second reflective plane being configured to sequentially reflect a multiplex optical signal so that the multiplex optical signal emitted from an end surface of the optical stub is folded back toward the optical stub and is sequentially incident to the optical demultiplexer, and the third reflective plane being configured to reflect the plurality of single-wavelength optical signals emitted from the optical demultiplexer toward the plurality of photo detectors; and a circuit board.

11 Claims, 6 Drawing Sheets

(56) References Cited

U.S. PATENT DOCUMENTS

| | | | |
|---|---|---|---|
| 2004/0042736 A1* | 3/2004 | Capewell | G02B 6/4215 |
| | | | 385/89 |
| 2013/0148970 A1* | 6/2013 | Nakajima | H04J 14/02 |
| | | | 398/79 |
| 2019/0052391 A1* | 2/2019 | Peterson | H04J 14/0278 |

* cited by examiner

OPTICAL RECEIVER AND OPTICAL BLOCK

TECHNICAL FIELD

An aspect of the present disclosure relates to an optical receiver and an optical block.

BACKGROUND

Japanese Unexamined Patent Publication No. 2017-32731 describes an optical receiver that wavelength-divides an input light including a plurality of signal lights having different wavelengths and reproduces an electrical signal from each signal light. Such an optical receiver includes an optical component, a photo detector, a signal amplifying IC (Transimpedance Amplifier (TIA)), and the like.

Here, in a transmission device, a large number of optical transceivers including an optical transmitter and an optical receiver are provided in parallel. If the optical receiver can be miniaturized, the number of transceivers arranged in parallel can be increased and the transmission device as a whole can perform large-capacity, high-speed, wide-band communication.

SUMMARY

An optical receiver according to an aspect of the present disclosure is an optical receiver configured to receive a multiplex optical signal including a plurality of single-wavelength optical signals having peak wavelengths different from each other, the optical receiver including: a circuit board having a first side; a plurality of photo detectors mounted on the first side and configured to convert the plurality of the single-wavelength optical signals to a plurality of electrical signals, each photo detector being configured to receive one of the optical signals in a relation of one to one; an amplifier mounted on the first side and configured to amplify the plurality of the electrical signals; an optical stub including an optical fiber configured to transmit the multiplex optical signal toward an inside of the optical receiver; an optical demultiplexer configured to demultiplex the multiplex optical signal to the single-wavelength optical signals; and an optical block having a first concavity, a second concavity, a first reflective plane, a second reflective plane, and a third reflective plane, the optical block being mounted on the first side, the first concavity being configured to hold the optical stub, the second concavity being configured to accommodate the optical demultiplexer, the first reflective plane being configured to reflect the multiplex optical signal from the optical stub toward the second reflective plane, the second reflective plane being configured to reflect the multiplex optical signal from the first reflective plane toward the optical demultiplexer, and the third reflective plane being configured to reflect the single-wavelength optical signals from the optical demultiplexer toward the photo detectors, in which the optical block is fastened to the first side and covers the plurality of the photo detectors and the amplifier.

DETAILED DESCRIPTION

Detail of Embodiment

Figure 1:
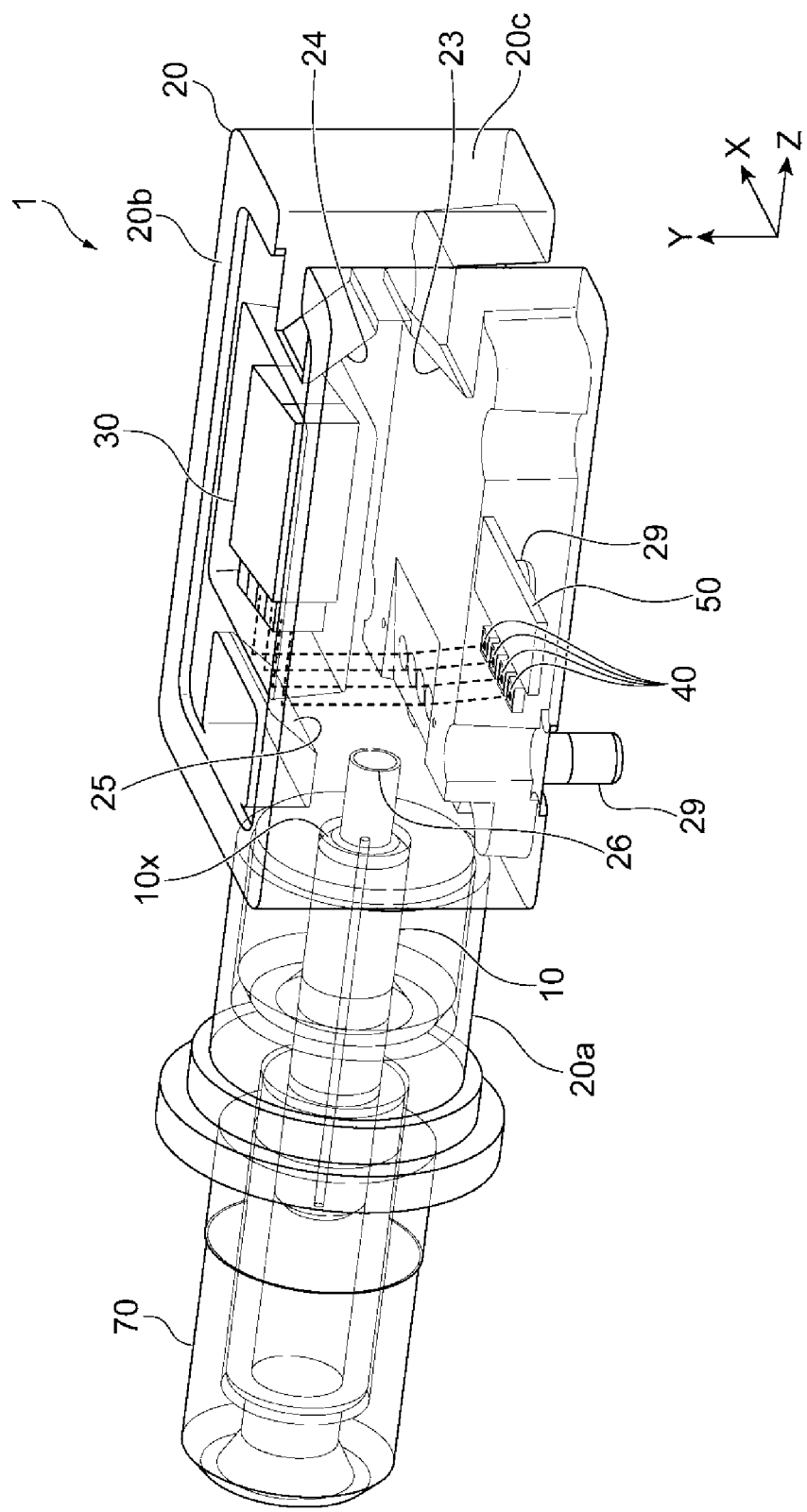
FIG. 1 is an internal transparent perspective view of an optical receiver according to this embodiment.
Figure 2:
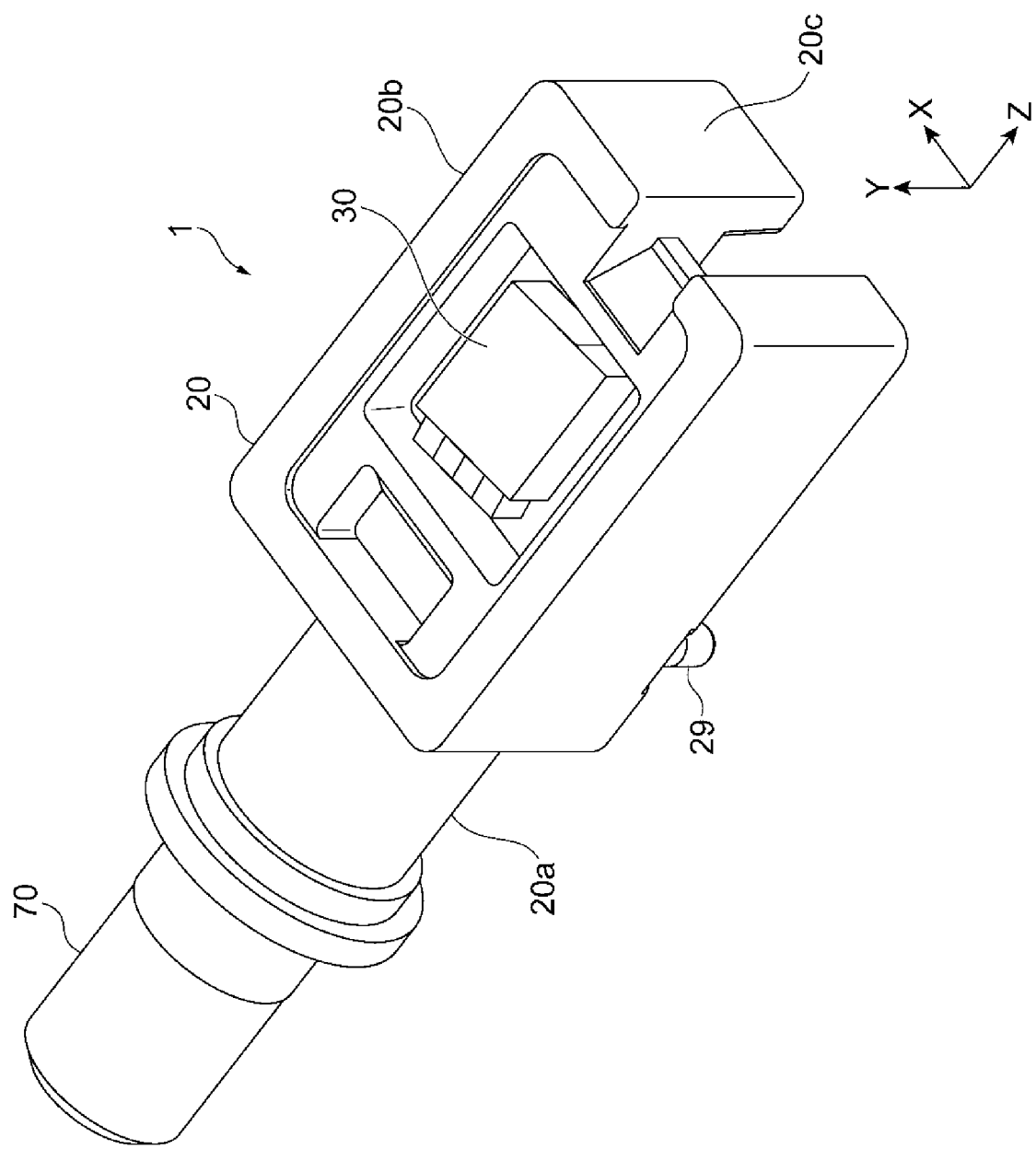
FIG. 2 is a perspective view of the optical receiver illustrated in FIG. 1.

A detailed example of an optical receiver according to an embodiment of the present disclosure will be described below with reference to the drawings. Additionally, the present disclosure is not limited to these examples, is defined by the claims, and is intended to include meanings equivalent to the claims and all modifications within the scope. In the following description, the same reference numerals are given to the same components in the description of the drawings and redundant description will be omitted.

FIGS. 1 to 4 are views schematically illustrating an optical receiver 1 according to this embodiment. The optical receiver 1 according to this embodiment receives a multiplex optical signal (wavelength-division multiplexing beam) in which a plurality of (single-wavelength optical signals (single-wavelength beams) having different peak wavelengths (or center wavelengths) are multiplexed. Hereafter, wavelength-division multiplexing is abbreviated as WDM. The optical receiver 1 is a WDM optical receiving module that optically demultiplexes the multiplex optical signal into the single-wavelength optical signals and regenerates the signal included in each single-wavelength optical signal. Each regenerated signal may be, for example, a Non Return to Zero (NRZ) signal having a binary signal level in amplitude or may be a Pulse Amplitude Modulation (PAM) 4 signal having a quaternary signal level in amplitude.

As illustrated in FIGS. 1 to 4, the optical receiver 1 includes an optical stub 10, an optical block 20, an optical demultiplexer 30, a plurality of photo detectors 40, a Transimpedance Amplifier (TIA) 50, a circuit board 60 (see FIG. 4), and a connector portion 70.

The optical stub 10 includes an optical fiber 90 which is embedded therein so as to transmit a multiplex optical signal to the optical block 20. The optical stub 10 is accommodated in the connector portion 70 and is optically connected to another stub (not illustrated) in the connector portion 70. Another stub includes another optical fiber. The optical stub 10 and another stub may make physical contact (PC) between the optical fiber 90 and another optical fiber. That is, the optical stub 10 forms an optical connection in such a manner that an end surface of the embedded optical fiber 90 contacts (physically contacts) an end surface of the optical fiber 90 of another stub. The multiplex optical signal which is transmitted by the optical fiber 90 is emitted from an end surface 10x of the optical stub 10 to a collimating lens 26 (to be described later) of the optical block 20.

Figure 4:
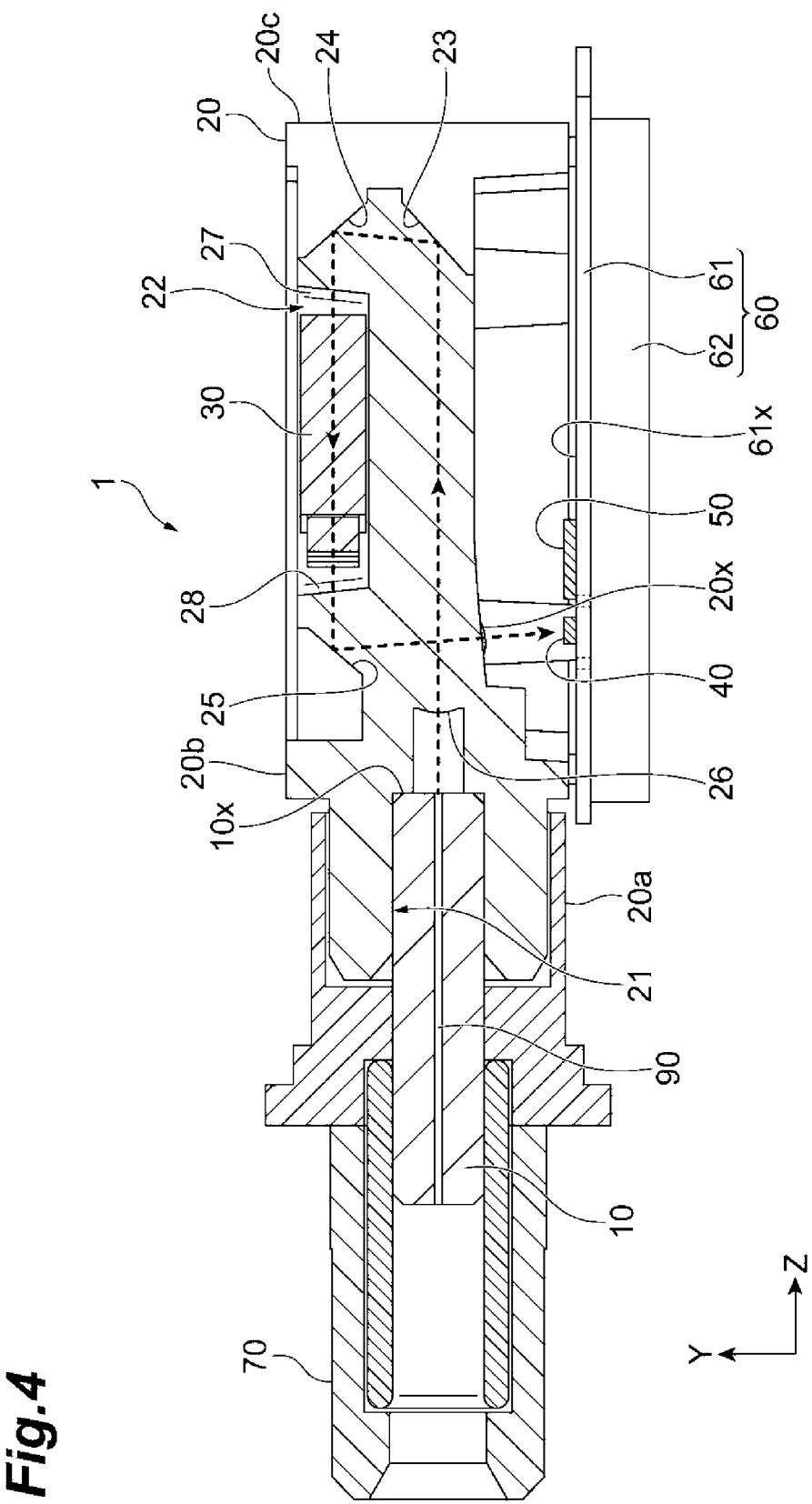
FIG. 4 is a cross-sectional view of the optical receiver illustrated in FIG. 1.

The optical block 20 is a lens component (a resin member) which is integrally molded. For example, the optical block is made from resin. As illustrated in FIG. 4, the optical block 20 includes a first concavity 21, a second concavity 22, a first reflective plane 23, a second reflective plane 24, a third reflective plane 25, a collimating lens 26, transmissive planes 27 and 28, and a positioning portion 29 (see FIG. 1).

The optical block 20 holds the optical stub 10 in the first concavity 21. That is, the optical stub 10 is fitted into the first concavity 21 so as to be positioned to the optical block 20. The optical stub 10 may be press-fit into, for example, the first concavity. The optical block 20 accommodates the optical demultiplexer 30 in the second concavity 22. Additionally, the optical demultiplexer 30 may be fitted into the second concavity 22 when being accommodated in the second concavity 22. For example, the optical demultiplexer 30 may be fitted into the second concavity 22 in such a manner that its outer shape is held by a protrusion or the like provided in the second concavity 22. Here, the fitting means, for example, that the optical demultiplexer 30 is accommodated in the second concavity without rattling. Thus, the optical demultiplexer 30 is fitted into the second concavity 22 so as to be positioned to the optical block 20. More specifically, the optical demultiplexer 30 is precisely positioned to the second reflective plane 24 by the second concavity. The multiplex optical signal emitted from the end surface 10x of the optical stub 10 toward the collimating lens 26 is referred to as WDM beam. The WDM beam emitted from the end surface 10x of the optical stub 10 is a diverging beam, which is converted to a collimate beam by the collimating lens 26. The WDM beam converted to the collimate beam travels from the collimating lens 26 toward the first reflective plane 23 in the optical block 20. Additionally, in the following description, a description can be made such that the direction of the WDM beam traveling from the collimating lens 26 to the first reflective plane 23 is the Z direction, the direction intersecting the Z direction and intersecting the light receiving plane of the photo detectors 40 is the Y direction, and the direction intersecting the Z direction and the Y direction is the X direction. Further, more specifically, the Z direction can be described such that the direction from the collimating lens 26 to the first reflective plane 23 is the +Z direction (incoming direction) and the opposite direction is the −Z direction. Further, more specifically, the Y direction can be described such that the direction toward the light receiving plane of the photo detectors 40 (for example, the downward direction in FIG. 4) is the −Y direction and the opposite direction is the +Y direction. Further, a description can be made such that the plane parallel to the X direction and the Y direction is the XY plane, the plane parallel to the Y direction and the Z direction is the YZ plane, and the plane parallel to the Z direction and the X direction is the ZX plane. The optical block 20 includes a main body 20b having a rectangular parallelepiped outer shape and a protrusion 20a extending from the main body 20b in the −Z direction. The protrusion 20a has a cylindrical outer shape in which a line parallel to the Z axis is a center axis. The first concavity 21 is provided inside the protrusion 20a. The optical stub 10 has a cylindrical outer shape in which a line parallel to the Z axis is a center axis. The first concavity 21 is a cylindrical hole in which the line parallel to the Z axis is a center axis and, for example, the optical stub 10 is fitted into the first concavity 21 so that its center axis matches the center axis of the first concavity 21. Due to such fitting, the first concavity 21 is positioned with respect to the X direction and the Y direction. The main body 20b of the optical block 20 has, for example, a rectangular parallelepiped outer shape which is elongated in the longitudinal direction (the Z direction). For example, the second concavity 22 is provided in the plane facing toward the +Y direction. The second concavity opens toward the +Y direction. The optical demultiplexer 30 has a rectangular parallelepiped outer shape and its outer shape includes an input plane which receives a WDM beam and an output plane which outputs a plurality of single-wavelength beams demultiplexed from the WDM beam. The input plane and the output plane are located on the opposite sides thereof in the outer shape of the optical demultiplexer. For example, the optical demultiplexer 30 is fitted into the second concavity 22 so that the input plane faces toward the +Z direction and the output plane faces toward the −Z direction.

The collimating lens 26 converts a diverging beam emitted from the end surface 10x of the optical stub 10 to a collimate beam. That is, the WDM beam passing through the collimating lens 26 travels in the +Z direction toward the first reflective plane 23 after being converted to the collimate beam.

The first reflective plane 23 is formed so that the WDM beam traveling from the −Z direction toward the +Z direction is reflected toward the +Y direction. The first reflective plane 23 is located in the +Z direction with respect to the end surface 10x of the optical stub 10. For example, the first reflective plane 23 is located between the collimating lens 26 and an end portion 20c of the optical block 20. The first reflective plane 23 is formed as a boundary plane between the resin member and a first reflective concavity while the optical block is provided with the concavity (the first reflective concavity). For example, when the optical block 20 is placed in air, the first reflective concavity is filled with air. The WDM beam is reflected due to a difference between the refractive index of the resin member and the refractive index of the air. The WDM beam which is reflected by the first reflective plane 23 travels toward the second reflective plane 24. The second reflective plane 24 is located in the +Y direction with respect to the first reflective plane 23. The optical block 20 is fixed onto the first side of the circuit board 60 to be described later. The first reflective plane 23 reflects the WDM beam traveling in a direction parallel to the first side toward a direction opposite to the first side. The direction of the WDM beam traveling from the end surface 10x to the first reflective plane 23 may be referred to as incoming direction. The WDM beam reflected by the first reflective plane 23 approaches the second reflective plane 24 in the direction opposite to the first side with going far from the first side. The first reflective plane 23 is located between the second reflective plane and the first side in the normal direction of the first side. Additionally, the reflection direction of the first reflective plane 23 is not limited to exactly a right angle (90°) to the first side (the +Y direction). The first reflective plane 23 may be somewhat inclined from the +Y direction to the Z direction, for example by several degrees. More specifically, the angle of the reflection direction from the first side in the YZ plane can be set to a value from 70° to 110°, namely within 90°±20°. Accordingly, the angle between the incoming direction and the direction of the WDM beam reflected by the first reflective plane 23 is adjustable in a range of 90°±20.

The second reflective plane 24 is formed so that the WDM beam reflected by the first reflective plane 23 is reflected toward the −Z direction. The optical block 20 is fixed onto the first side of the circuit board 60 to be described later. The second reflective plane 24 reflects the WDM beam traveling from the first reflective plane 23 in a direction opposite to the first side toward a direction parallel to the first side. At this time, the WDM beam reflected by the second reflective plane 24 travels in the opposite direction of the Z direction (namely the −Z direction) with respect to the WDM beam incident to the first reflective plane 23. In this way, the first reflective plane 23 and the second reflective plane 24 sequentially reflect the WDM beam so that the WDM beam traveling in the incoming direction is folded back toward the optical stub 10 (that is, the direction of the WDM beam directed in the +Z direction is changed by 180° in the YZ plane so as to be directed in the −Z direction). The second reflective plane 24 is formed as a boundary plane between the resin member and the second reflective concavity while the optical block is provided with the concavity (the second reflective concavity). For example, when the optical block 20 is disposed in air, the second reflective concavity is filled with the air. The WDM beam is reflected due to a difference between the refractive index of the resin member and the refractive index of the air. More specifically, when the angle between the reflection direction of the first reflective plane 23 and the incoming direction is set to a value A23, an angle between the reflection direction of the second reflective plane 24 and the incident direction to the second reflective plane 24 may be set to a value A24 so that an equation A23+A24=180☐ is satisfied. The WDM beam reflected by the second reflective plane 24 passes through the transmissive plane 27 and reaches the optical demultiplexer 30 provided in the second concavity 22. Additionally, the transmissive plane 27 is one plane that forms the second concavity 22 in the main body 20b and is a boundary plane between the second concavity 22 and the main body 20b of the optical block 20. Then, four single-wavelength beams for respective wavelengths obtained by the demultiplexing (wavelength-dividing) in the optical demultiplexer 30 pass through the transmissive plane 28, are incident to the optical block 20 again, and reach the third reflective plane 25. The four single-wavelength beams are also collimate beams. The transmissive plane 28 is one plane that forms the second concavity 22 in the main body 20b and is a boundary plane between the second concavity 22 and the main body 20b of the optical block 20.

The third reflective plane 25 is formed so that four (a plurality of) single-wavelength beams emitted from the optical demultiplexer 30 are reflected toward the plurality of photo detectors 40 (see FIG. 1). The third reflective plane 25 is located between the end surface 10x of the optical stub 10 and the optical demultiplexer 30, for example, in the Z direction. The third reflective plane 25 is formed as a boundary plane between the resin member and the third reflective concavity while the optical block is provided with the concavity (the third reflective concavity). For example, when the optical block 20 is disposed in air, the third reflective concavity is filled with the air. The single-wavelength beams are reflected due to a difference between the refractive index of the resin member and the refractive index of the air. Additionally, the third reflective plane 25 performs a reflection, for example, so that one single-wavelength beam is incident to one of four photo detectors 40 and four single-wavelength beams correspond to four photo detectors 40 in a relation of one to one. The third reflective plane 25 reflects the plurality of single-wavelength beams so that the incident angle of the single-wavelength beam with respect to the light receiving plane of the photo detector 40 is not perpendicular. That is, the third reflective plane 25 reflects each single-wavelength beam toward a direction slightly inclined in the Z direction (for example, the +Z direction) instead of the perfect −Y direction (the direction perfectly perpendicular to the light receiving plane of the photo detector 40). When the single-wavelength beam enters the photo detector 40, the incident angle different from the perpendicular direction prevents some portion of the single-wavelength beam reflected by the light receiving plane from returning straight to the third reflective plane 25. Each single-wavelength beam reflected by the third reflective plane 25 is condensed on the light receiving plane (the surface) of the photo detectors 40 by an exit lens 20c (see FIG. 4). The exit lens 20c includes a lens which focuses a single-wavelength beam on the light receiving plane of a photo detector. Here, the light receiving plane of the photo detectors 40 is, for example, a plane parallel to the XZ plane. Alternatively, the light receiving plane of the photo detectors 40 is a plane which is parallel to a mounting plane 61x (a first side) of the circuit board 60 on which the photo detectors 40 are mounted.

The positioning portion 29 is provided in, as illustrated in FIG. 1, a portion facing the circuit board 60 (see FIG. 4) in the optical block 20. For example, the positioning portion 29 is a cylindrical portion extending toward the circuit board 60. For example, the positioning portion 29 is provided on a plane facing toward the −Y direction of the main body 20b of the optical block 20 and is a cylindrical protrusion extending in the −Y direction. The optical block 20 is provided with a plurality of (for example, two) positioning portions 29. The positioning portion 29 is formed so as to be insertable into an insertion hole (not illustrated) formed in the circuit board 60. The positioning portion 29 is inserted into the insertion hole of the circuit board 60. The plurality of positioning portions 29 are provided with a plurality of insertion holes. The plurality of positioning portions 29 are provided so as to correspond to the plurality of insertion holes in a relation of one to one so that each positioning portion 29 is inserted into each of the plurality of insertion holes. Accordingly, the optical block 20 is positioned with respect to the circuit board 60. For example, the plurality of insertion holes are provided in the mounting plane 61x (the first side) of the circuit board 60 and the plurality of positioning portions 29 are provided on the plane of the main body 20b of the optical block 20 facing the mounting plane 61x. For example, the position of the optical block 20 with respect to the mounting plane 61x is fixed by inserting one positioning portion 29 into one insertion hole and the direction of the optical block 20 on the mounting plane 61x is determined by inserting the other positioning portion 29 into the other insertion hole. Additionally, the aligning and positioning may be performed by forming the insertion hole of the circuit board 60 to be slightly larger than the positioning portion 29. Further, the positioning may be performed more finely by press-inserting the positioning portion 29 into the insertion hole of the circuit board 60. In this way, if the positioning portion 29 can be inserted into the insertion hole, the outer shape of the positioning portion may be, for example, a rectangular prism. In that case, the shape of the insertion hole may be a rectangular shape similar to the rectangular shape in the cross-section of the positioning portion 29 perpendicular to the Y direction.

Figure 3:
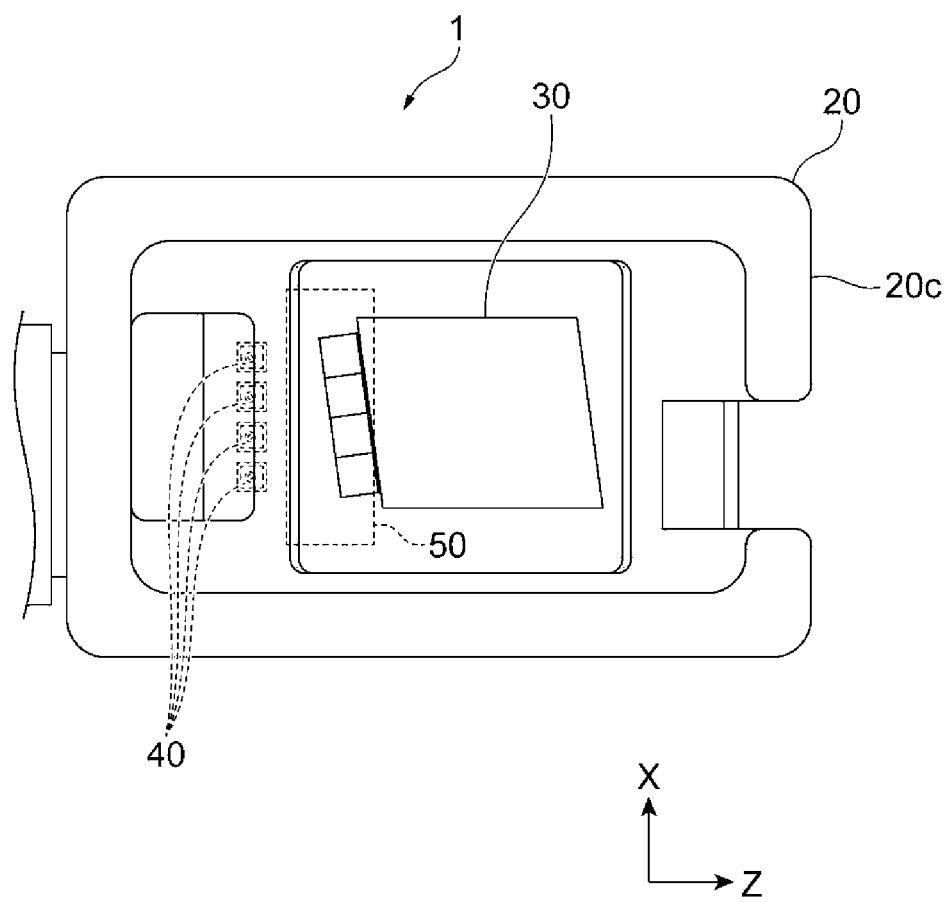
FIG. 3 is an internal transparent plan view of the optical receiver illustrated in FIG. 1.

The optical demultiplexer 30 is configured to demultiplex a WDM beam to a plurality of single-wavelength beams. The optical demultiplexer 30 is provided in the second concavity 22 and divides the WDM beam reflected by the second reflective plane 24 into single-wavelength beams on the basis of the wavelength. In order to sequentially guide the incident WDM beam to respective wavelength filters 30b (see FIG. 5), the optical demultiplexer 30 includes, as illustrated in FIG. 3, a plane (an input plane) to which the WDM beam is incident and a plane (an output plane) which outputs the single single-wavelength beams. The input plane and the output plane are inclined with respect to the direction (the +X direction) intersecting the direction (the −Z direction) to which the WDM beam is incident. For example, when the optical block 20 is viewed in plan view from the +Y direction, the optical demultiplexer 30 has a parallelogram shape.

Figure 5:
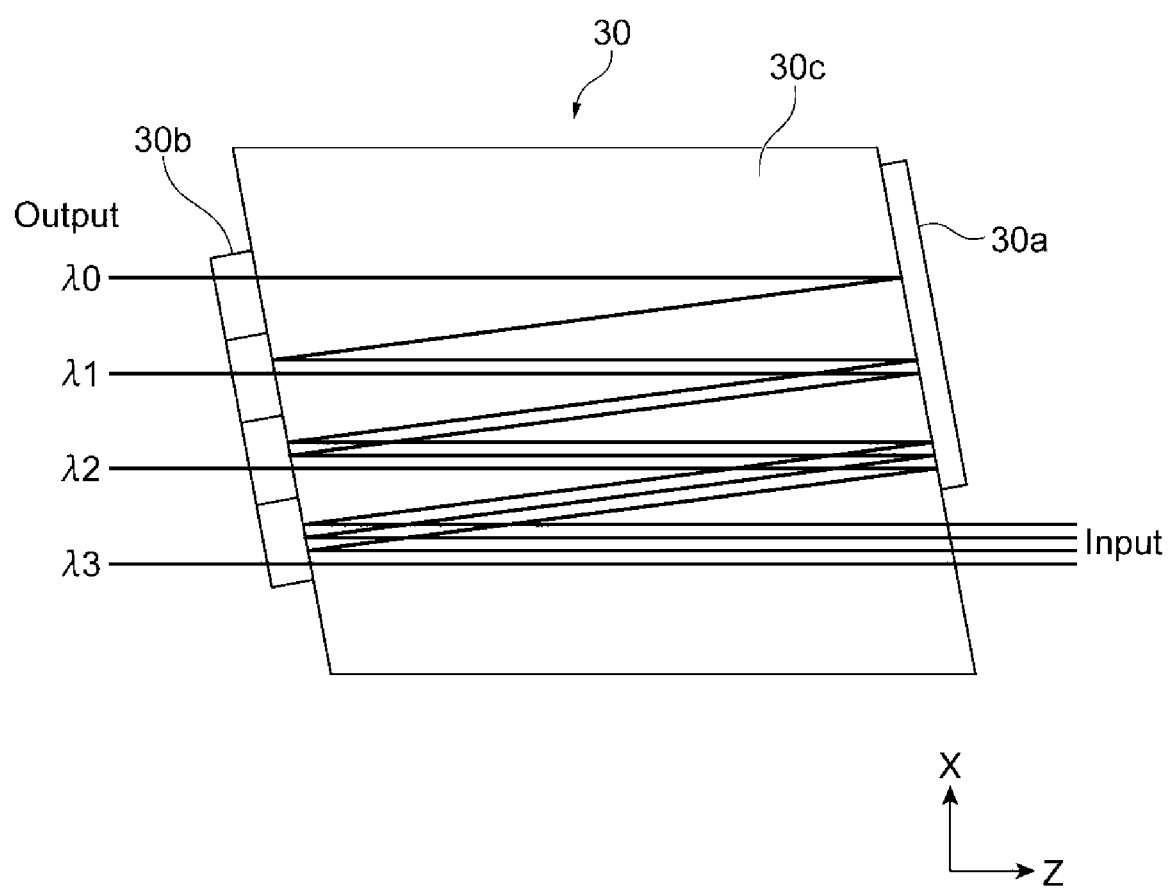
FIG. 5 is an explanatory diagram of an optical demultiplexer included in the optical receiver.

FIG. 5 is an explanatory diagram of the optical demultiplexer 30 included in the optical receiver 1. As illustrated in FIG. 5, the optical demultiplexer 30 has a configuration in which a single reflective member 30a is integrated with the plurality of wavelength filters 30b having different wavelength transmission bands by a transparent optical member 30c. The wavelength filter 30b is configured as, for example, a dielectric multilayer film (filter group). Specifically, when single-wavelength beams having a plurality of different peak wavelengths ($\lambda 0$, $\lambda 1$, $\lambda 2$, and $\lambda 3$) are incident to the optical demultiplexer 30, the WDM beam is first incident to the wavelength filter 30b disposed at the first position so that only the single-wavelength beam of the wavelength $\lambda 3$ is transmitted and the WDM beam ($\lambda 0$, $\lambda 1$, and $\lambda 2$) of the other wavelengths are reflected. Additionally, in FIG. 5, for convenience of description, the optical paths of the plurality of single-wavelength beams are depicted as lines, respectively, but in fact, one WDM beam includes a plurality of single-wavelength beams having different peak wavelengths. The reflected WDM beam ($\lambda 0$, $\lambda 1$, and $\lambda 2$) are reflected by the reflective member 30a and are incident to the second wavelength filter 30b so that only the beam of the wavelength $\lambda 2$ is transmitted and the WDM beam ($\lambda 0$ and $\lambda 1$) of the other wavelengths are reflected. Hereinafter, the WDM beam input to the input plane by repeating the transmission and the reflection in the same way is demultiplexed into a plurality of single-wavelength beams having different peak wavelengths and the single-wavelength beams are output from the output plane. In this way, the optical demultiplexer 30 optically demultiplexes the WDM beam into a plurality of single-wavelength beams. When the WDM beam is a collimate beam, each single-wavelength beam keeps to be a collimate beam. The input plane is inclined at a significant angle with respect to the X direction and the output plane is inclined at the same significant angle as the input plane with respect to the X direction.

The plurality of photo detectors 40 are elements that respectively receive a plurality of single-wavelength beams demultiplexed by the optical demultiplexer 30 and reflected by the third reflective plane 25. In this embodiment, the optical receiver 1 includes four photo detectors 40 which are provided so as to respectively correspond to four demultiplexed single-wavelength beams (see FIG. 3). That is, four photo detectors respectively receive four single-wavelength beams. The plurality of photo detectors 40 convert the plurality of received single-wavelength beams into a plurality of electrical signals (current signals) and output the electrical signals. The plurality of photo detectors 40 are mounted on the mounting plane 61x (the first side) of a Flexible printed circuits (FPC) 61 of the circuit board 60. As illustrated in FIG. 4, the light receiving planes of the plurality of photo detectors 40 are disposed between the end surface 10x of the optical stub 10 and the optical demultiplexer 30 in the Z direction.

The TIA 50 is an amplifier which converts the electrical signals (current signals) output from the plurality of photo detectors 40 into voltage signals and amplifies the voltage signals. The TIA 50 is mounted on the mounting plane 61x (the first side) of the FPC 61 of the circuit board 60 and is disposed so as to be adjacent to the plurality of photo detectors 40 in the +Z direction. The electrical signal (the voltage signal) output from the TIA 50 is output to the outside via the FPC 61.

The circuit board 60 includes, as illustrated in FIG. 4, the FPC 61 and a reinforcing substrate 62. The reinforcing substrate 62 is a substrate that reinforces the thin FPC 61 so as to have a planar shape and is provided so as to mount the FPC 61. The FPC 61 is a flexible printed substrate. The FPC 61 includes the mounting plane 61x (the first side). The mounting plane 61x mounts, for example, the plurality of photo detectors 40 and the TIA 50 thereon. For example, other ICs or circuit components may be mounted on the mounting plane 61x. In the circuit board 60, the optical block 20 is disposed on the mounting plane 61x of the FPC 61 so as to cover the plurality of photo detectors 40 and the TIA 50. The optical block 20 may be fixed onto the mounting plane 61x. The FPC 61 and the reinforcing substrate 62 are provided with the above-described insertion hole. When the plurality of positioning portions 29 of the optical block 20 are fitted into the plurality of insertion holes of the circuit board 60, a plurality of single-wavelength beams reflected by the third reflective plane 25 of the optical block 20 can be respectively incident to the light receiving planes of the plurality of photo detectors 40 mounted on the mounting plane 61x. Accordingly, he fitting of the positioning portions 29 to the insertion holes allows the optical coupling between the optical block 20 and the photo detector 40 mounted on the mounting plane 61x to be easily obtained.

Next, the effects of the optical receiver 1 according to this embodiment will be described.

Figure 6:
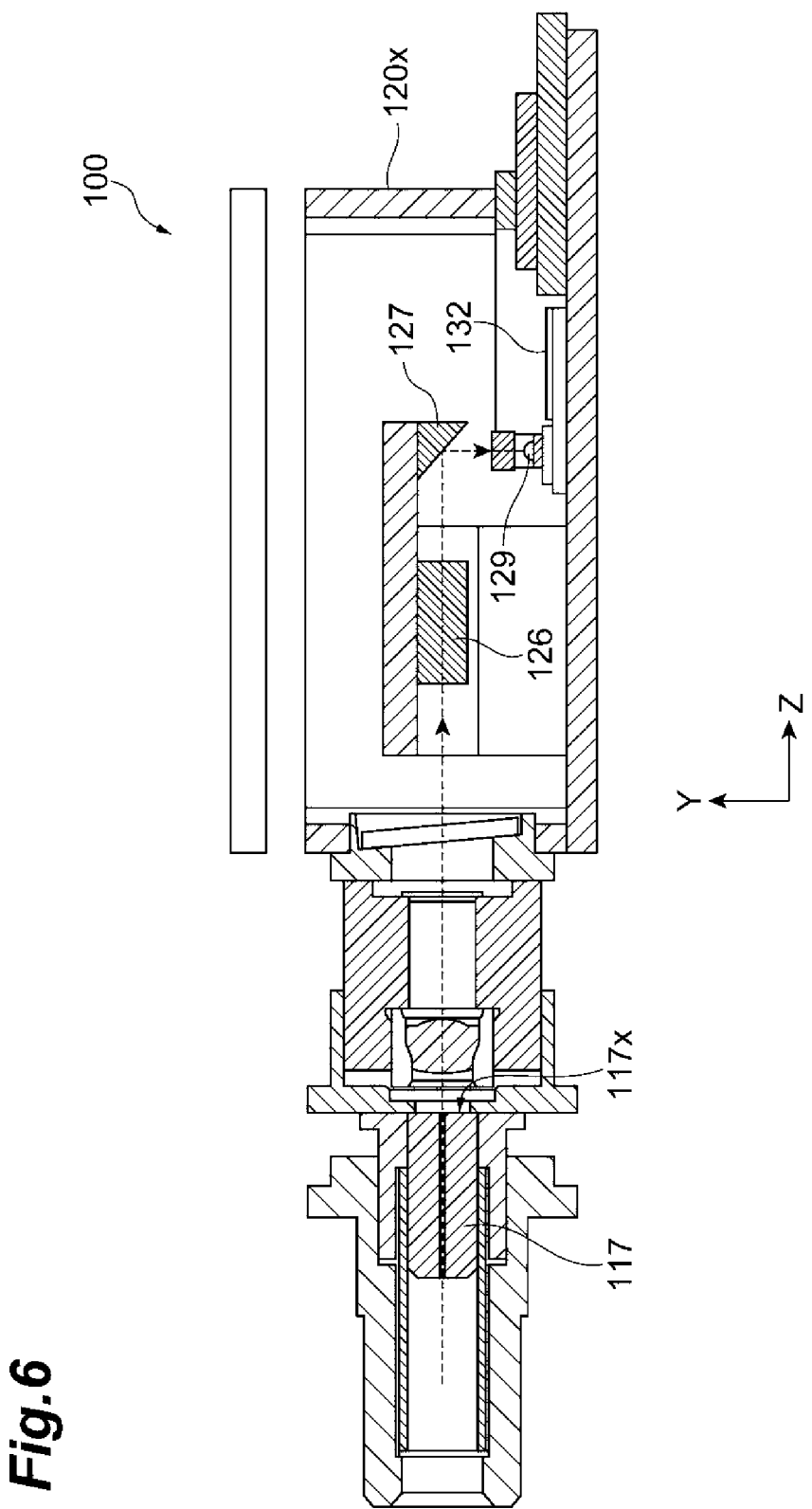
FIG. 6 is a cross-sectional view of an optical receiver according to a comparative example.

First, an optical receiver 100 according to a comparative example will be described with reference to FIG. 6. As illustrated in FIG. 6, the optical receiver 100 according to the comparative example includes an optical stub 117, an optical demultiplexer 126, a photo detector 129, and a TIA 132 similarly to the optical receiver 1 according to this embodiment. Here, in the optical receiver 100 according to the comparative example, a WDM beam emitted from the end surface of the optical stub 117 is incident to the optical demultiplexer 126 and a plurality of single-wavelength beams demultiplexed by the optical demultiplexer 126 are reflected toward the photo detector 129 by the reflective member 127. The plurality of single-wavelength beams reflected by the reflective member 127 are received by the photo detector 129 and an electrical signal output from the plurality of photo detectors 129 are amplified by the TIA 132. In such an optical receiver 100, the optical demultiplexer 126, the photo detector 129, and the TIA 132 are sequentially arranged in the emission direction (the +Z direction) of the WDM beam emitted from the end surface of the optical stub 117. In such a configuration, since the position of the photo detector 129 is located at a position equal to or deeper than the entire length of the optical demultiplexer 126 (the deep position in the emission direction) and the TIA 132 is disposed at the rear stage (the deeper position) of the photo detector 129, the entire length of the optical receiver 100 (the length of the outer shape of the +Z direction) becomes larger than the sum of at least the entire length of the optical demultiplexer 126 (the length of the outer shape of the +Z direction) and the entire length of the TIA 132 (the length of the outer shape of the +Z direction).

In contrast, as illustrated in FIG. 4, the optical receiver 1 according to this embodiment is an optical receiver that receives a multiplex optical signal in which a plurality of single-wavelength optical signals having different peak wavelengths are multiplexed. The optical receiver 1 includes the optical stub 10, the optical demultiplexer 30, the photo detector 40, the TIA 50, the optical block 20, and the circuit board 60. The optical stub 10 includes the optical fiber 90 which is embedded therein so as to transmit a multiplex optical signal. The optical demultiplexer 30 demultiplexes (wavelength-divides) a WDM beam into a plurality of single-wavelength beams. The plurality of photo detectors 40 respectively receive the plurality of single-wavelength beams demultiplexed by the optical demultiplexer 30. The TIA 50 amplifies a plurality of electrical signals output from the plurality of photo detectors 40. The optical block 20 includes the first concavity 21, the second concavity 22, the first reflective plane 23, the second reflective plane 24, and the third reflective plane 25. The first concavity 21 is formed in the cylindrical protrusion 20a extending in the −Z direction from a side facing the −Z direction of the optical block 20 and holds the optical stub 10. The second concavity 22 is provided so as to be located in the +Y direction with respect to the signal light traveling from the optical stub 10 toward the first reflective plane 23. The second concavity 22 is provided in the optical block 20 so as to open in the +Y direction and accommodates the optical demultiplexer 30. The first reflective plane 23 and the second reflective plane 24 sequentially reflect the WDM beam so that the WDM beam emitted from the end surface 10x of the optical stub 10 and traveling in the +Z direction is folded back by 180° in the YZ plane of the direction of the optical stub 10 (the −Z direction) and is incident to the optical demultiplexer 30. That is, the WDM beam which is incident to the first reflective plane 23 is reflected in the +Y direction and the WDM beam which is reflected by the first reflective plane 23 and is incident to the second reflective plane 24 is reflected in the −Z direction. The optical path of the WDM beam folded back by the first reflective plane 23 and the second reflective plane 24 is located in the +Y direction in relation to the optical path of the WDM beam which is incident to the first reflective plane 23 before being folded back. The third reflective plane 25 reflects the plurality of single-wavelength beams emitted from the optical demultiplexer 30 toward the plurality of photo detectors 40. At this time, the plurality of single-wavelength beams are reflected so that one single-wavelength beam is incident to one photo detector 40. The circuit board 60 includes the mounting plane 61x, the plurality of photo detectors 40 and the TIA 50 are mounted on the mounting plane 61x, and the optical block 20 is disposed on the mounting plane 61x so as to cover the plurality of photo detectors 40 and the TIA 50.

In such an optical receiver 1, the WDM beam emitted from the end surface 10x of the optical stub 10 is folded back by 180° toward the optical stub 10 by the first reflective plane 23 and the second reflective plane 24 and is incident to the optical demultiplexer 30. At this time, WDM beam which is incident to the first reflective plane 23 is reflected in the +Y direction and the WDM beam which is reflected by the first reflective plane 23 and is incident to the second reflective plane 24 is reflected in the −Z direction. Then, in the optical receiver 1, the plurality of single-wavelength beams emitted from the optical demultiplexer 30 are reflected toward the plurality of photo detectors 40 by the third reflective plane 25. At this time, the reflection is performed so that one single-wavelength beam is incident to one photo detector 40 and the plurality of single-wavelength beam correspond to the plurality of photo detectors 40 in a relation of one to one. According to such a configuration, since the WDM beam travels in the +Z direction in relation to the position of the optical demultiplexer 30, is folded back toward the optical stub 10, and is incident to the optical demultiplexer 30, the photo detector 40 can be disposed, for example, on the side of the end surface 10x of the optical stub 10 in relation to the optical demultiplexer 30. As described above, the entire length of the optical receiver can be made smaller than the configuration in which the optical demultiplexer, the photo detector, and the amplifier are arranged sequentially (in one direction) (the configuration of the optical receiver 100 according to the comparative example illustrated in FIG. 6). Specifically, for example, in the optical receiver 100 according to the comparative example, the entire length (from the end surface 117x of the optical stub 117 to an end portion 120x of a package) needs to be about 20 mm. However, in the optical receiver 1 according to this embodiment, since the TIA 50 can be disposed below the optical demultiplexer 30, the entire length of the optical receiver 1 (from the end surface 10x of the optical stub 10 to an end portion 20c of a package) becomes about 15 mm without depending on the entire length of the TIA 50. That is, the optical receiver 1 according to this embodiment is miniaturized to be about 5 mm in the Z direction compared to the optical receiver 100 according to the comparative example as an example. As described above, according to the configuration of this embodiment, the optical receiver 1 suitable for miniaturization can be provided. Accordingly, when a large number of optical receivers 1 are arranged in the transmission device, higher density mounting becomes possible and the communication band per mounting area can be widened. Further, even when the optical receiver 1 is combined with an optical transmitter and an electronic circuit to form an optical transceiver module (optical transceiver), the size of the optical transceiver can be reduced as compared with the conventional one. Accordingly, since a large number of optical transceivers can be arranged in the transmission device, a larger number of optical transceivers can be mounted and the communication band per mounting area can be widened.

In the above-described optical receiver 1, the light receiving plane of the photo detector 40 may be disposed between the end surface 10x of the optical stub 10 and the optical demultiplexer 30 in the emission direction of the multiplex optical signal emitted from the end surface 10x of the optical stub 10. According to such a configuration, the photo detector 40 is reliably disposed on the side of the end surface 10x of the optical stub 10 in relation to the optical demultiplexer 30 and hence the entire length of the optical receiver 1 can be further reduced.

In the above-described optical receiver 1, the third reflective plane 25 may reflect the plurality of single-wavelength beams so that the incident angle of the plurality of single-wavelength beams with respect to the light receiving plane of the photo detector 40 does not become perpendicular. When the plurality of single-wavelength beams are incident to the light receiving plane of the photo detector 40 in the perpendicular direction, there is concern that the reflected light of the light receiving plane may be returned straight to the third reflective plane 25 (as a return light). Regarding this point, the generation of the return light described above can be prevented by reflecting the plurality of single-wavelength beams so that the incident angle with respect to the light receiving plane does not become perpendicular.

In the above-described optical receiver 1, the optical block 20 may include the positioning portion 29 (see FIG. 1) which extends toward the circuit board 60 and the positioning portion 29 may be formed so as to be insertable into an insertion hole (not illustrated) formed in the circuit board 60. According to such a configuration, when the positioning portion 29 is inserted into the insertion hole, the optical block 20 can be easily and reliably positioned to the circuit board 60.

What is claimed is:
1. An optical receiver configured to receive a multiplex optical signal including a plurality of single-wavelength optical signals having peak wavelengths different from each other, the optical receiver comprising:
    a circuit board having a first side;
    a plurality of photo detectors mounted on the first side and configured to convert the plurality of the single-wavelength optical signals to a plurality of electrical signals, each photo detector being configured to receive one of the single-wavelength optical signals in a relation of one to one;
an amplifier mounted on the first side and configured to amplify the plurality of the electrical signals;
an optical stub including an optical fiber configured to transmit the multiplex optical signal toward an inside of the optical receiver;
an optical demultiplexer configured to demultiplex the multiplex optical signal to the single-wavelength optical signals; and
an optical block having a first concavity, a second concavity, a first reflective plane, a second reflective plane, and a third reflective plane, the optical block being mounted on the first side, the first concavity being configured to hold the optical stub, the second concavity being configured to accommodate the optical demultiplexer, the first reflective plane being configured to reflect the multiplex optical signal traveling in an incoming direction from the optical stub toward the second reflective plane, the second reflective plane being configured to reflect the multiplex optical signal from the first reflective plane toward the optical demultiplexer along a folded-back direction opposite to the incoming direction, and the third reflective plane being configured to reflect the single-wavelength optical signals from the optical demultiplexer toward the photo detectors,
wherein the optical block is fastened to the first side and covers the plurality of the photo detectors and the amplifier.

2. The optical receiver according to claim 1, wherein the plurality of the photo detectors are located between the optical stub and the optical demultiplexer in the incoming direction.

3. The optical receiver according to claim 2, wherein the amplifier is located between the plurality of the photo detectors and the first reflective plane in the incoming direction.

4. The optical receiver according to claim 1, wherein the third reflective plane allows the single-wavelength optical signals to enter the photo detectors with an incident angle different from a right angle.

5. The optical receiver according to claim 4, wherein the incident angle prevents the photo detectors from reflecting (a portion of) the single-wavelength optical signals back to the third reflective plane.

6. The optical receiver according to claim 1, wherein the optical block has protrusions configured to be fitted into holes formed on the first side of the circuit board.

7. The optical receiver according to claim 6, wherein the protrusions includes two protrusions arranged in a direction crossing the incoming direction.

8. The optical receiver according to claim 1, wherein the first reflective plane is located between the second reflective plane of the optical block and the first side of the circuit board in a direction parallel to a normal line of the first side,
wherein the optical demultiplexer is located between the optical stub and the second reflective plane in the incoming direction, and
wherein the third reflective plane is located between the optical stub and the optical demultiplexer in the incoming direction.

9. The optical receiver according to claim 1, wherein the optical block includes an optical lens between the optical stub and the first reflective plane in the incoming direction, and
wherein the optical lens converts a diverging beam of the multiplex optical signal emitted from the optical stub to a collimate beam of the multiplex optical signal.

10. The optical receiver according to claim 1, wherein the optical demultiplexer is fitted into the second concavity, and
wherein the second concavity allows the optical demultiplexer to be aligned with the second reflective plane.

11. An optical block configured to be fixed to a circuit board, the optical block comprising:
an optical demultiplexer configured to demultiplex a multiplex optical signal to a plurality of single-wavelength optical signals having peak wavelengths different from each other; and
a resin body having a concavity, an optical lens, a first reflective plane, a second reflective plane, and a third reflective plane, the concavity being configured to hold the optical demultiplexer, the optical lens being configured to receive the multiplex optical signal, the first reflective plane being configured to reflect the multiplex optical signal traveling in an incoming direction from the optical lens toward the second reflective plane, the second reflective plane being configured to reflect the multiplex optical signal from the first reflective plane toward the optical demultiplexer along a folded-back direction opposite to the incoming direction, and the third reflective plane being configured to reflect the single-wavelength optical signals from the optical demultiplexer toward the circuit board.

* * * * *